Feb. 25, 1958 T. O. SUMMERS, JR 2,824,451
GYROSCOPE WITH DIRECT CURRENT TORQUING
Filed April 1, 1953 7 Sheets-Sheet 2

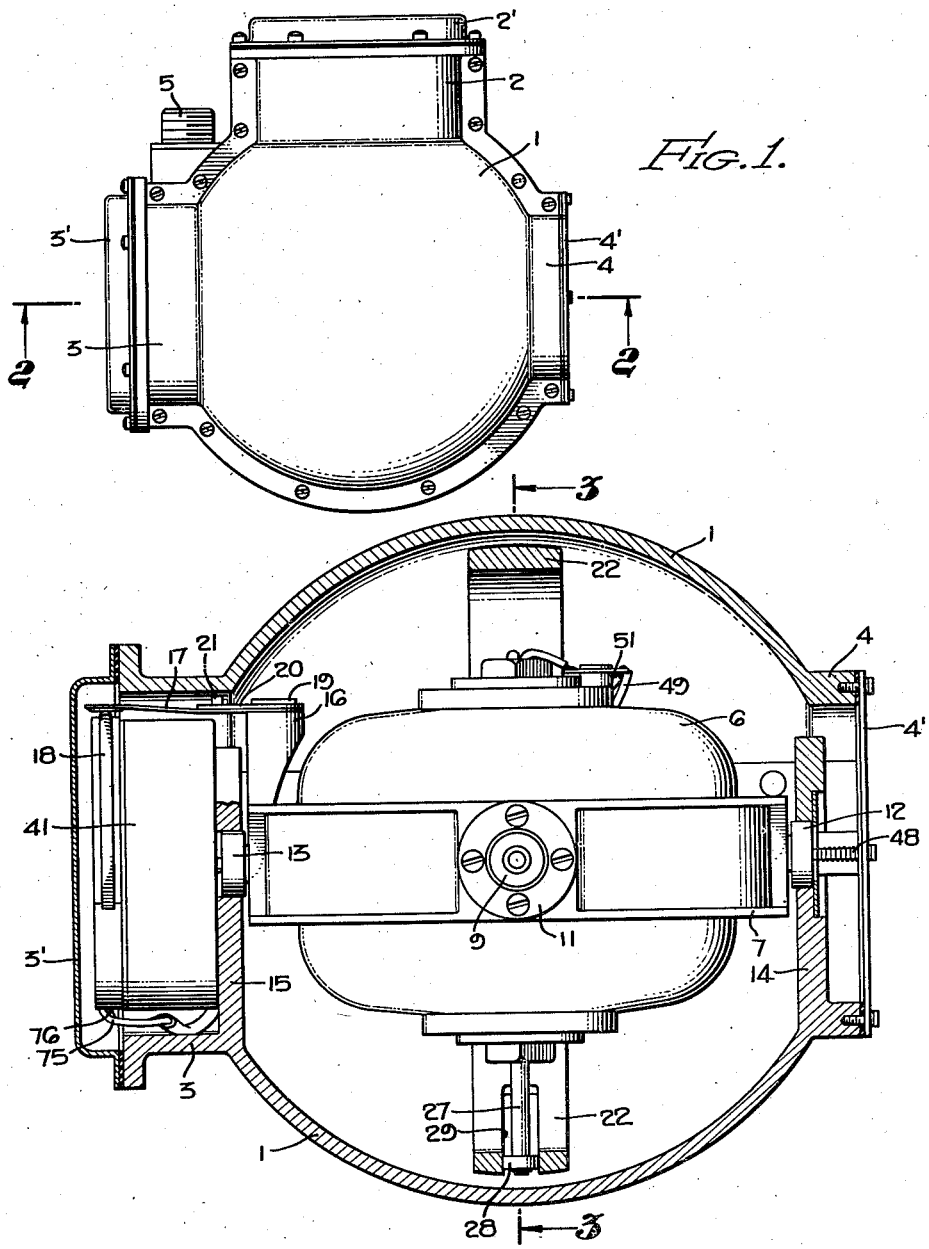

THOMAS O. SUMMERS, JR.
INVENTOR.

BY R. E. Geangue

ATTORNEY

Feb. 25, 1958     T. O. SUMMERS, JR     2,824,451
GYROSCOPE WITH DIRECT CURRENT TORQUING

Filed April 1, 1953     7 Sheets-Sheet 4

THOMAS O. SUMMERS, JR.
INVENTOR.

BY R. E. Geaugue

ATTORNEY

Feb. 25, 1958 T. O. SUMMERS, JR 2,824,451
GYROSCOPE WITH DIRECT CURRENT TORQUING
Filed April 1, 1953 7 Sheets-Sheet 5

THOMAS O. SUMMERS, JR.
INVENTOR.

BY R. E. Geauque

ATTORNEY

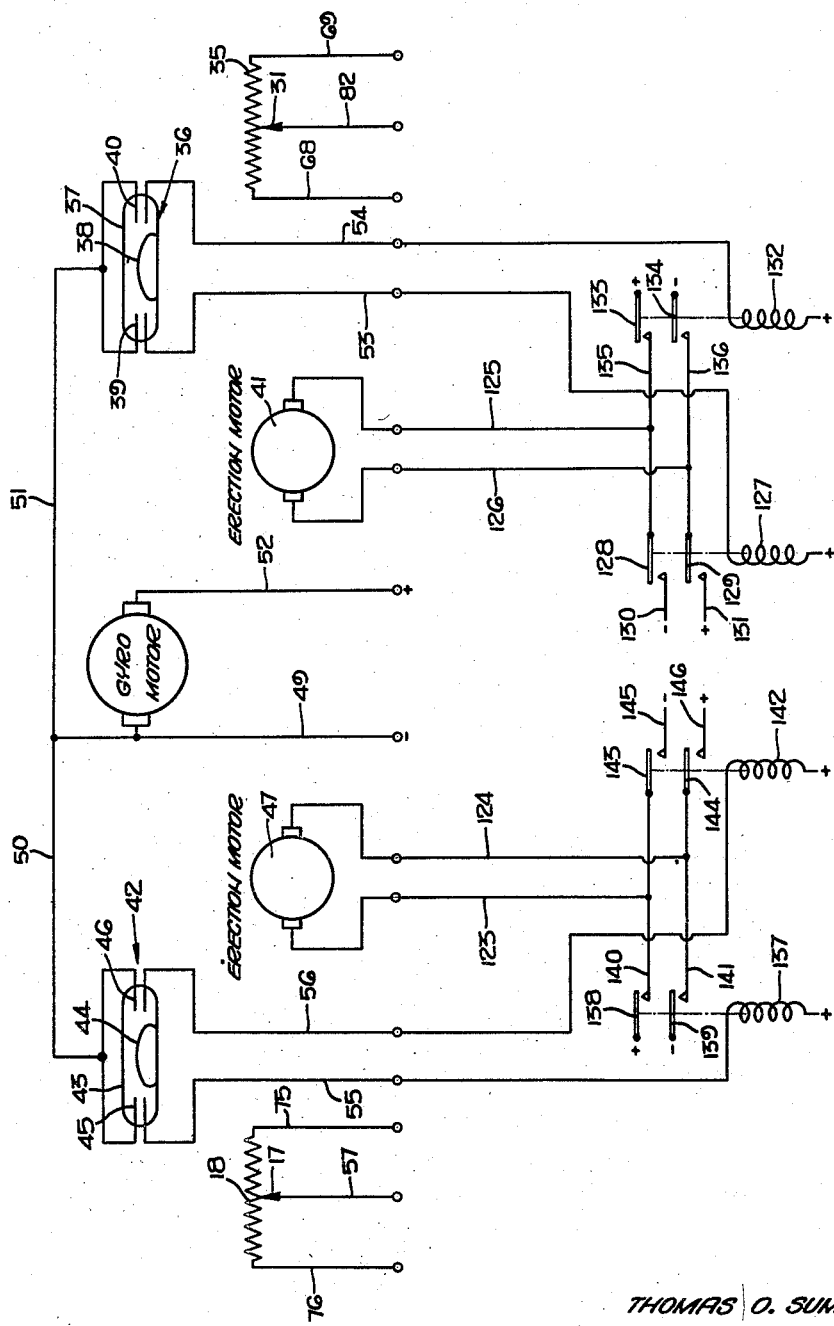

United States Patent Office 2,824,451
Patented Feb. 25, 1958

2,824,451

GYROSCOPE WITH DIRECT CURRENT TORQUING

Thomas O. Summers, Jr., Sherman Oaks, Calif., assignor to Summers Gyroscope Company, Santa Monica, Calif., a corporation of California Application April 1, 1953, Serial No. 346,141

15 Claims. (Cl. 74—5.47)

This invention relates to gyroverticals for use in land, air and water craft and more particularly to the type of gyrovertical employing electrolytic gravity switches to energize torquing motors. More particularly, the invention relates to gyroverticals which utilize D.-C. torquers without having the undesirable precession or drift which accompanies such torquers when the usual type of D.-C. motor is employed.

Previous erecting mechanism, comprised of torquing motors, worked effectively only in gyroscopes operating on alternating current since direct current torquers have been found ineffective because of their inherent residual magnetism. These D.-C. torquers have usually taken the form of small D.-C. motors which are either of a series-wound type or the permanent magnetic type. The armatures of such motors are wound on iron laminations which are easily attracted by the field magnets and such an attraction causes undesirable precession or drift of the gyroscope from true vertical. Direct current erecting torquers also may comprise a magnetic solenoid attached, for example, to the case of the gyroscope, and an armature in proximity therewith eccentrically attached to the gimbal so as to provide a constantly erecting torque about the gimbal axis by the energization of the solenoid. This type of erecting device is also subject to the undesirable effects of residual magnetism, with the result that the gyro may be undesirably precessed away from the true vertical.

By the present invention, it is proposed to provide a D.-C. torquer designed to operate in conjunction with an electrolytic gravity switch, and which will place no undesirable torques about the gyro gimbal axis due to residual magnetism. To this end, it is proposed to utilize a motor similar to the conventional D.-C. permanent magnet except that the armature winding of the proposed motor is fixed to a non-magnetic support. Because of this non-magnetic support, the armature will not tend to follow the pole pieces of the torquer when the aircraft moves relative to the gyrovertical, and thus, a torque will be placed upon the gyro gimbals by the erecting motors only when the gyro moves away from true vertical.

It is, therefore, an object of the present invention to provide a gyroscope which utilizes direct current torquing motors without having the disadvantages resulting from the inherent residual magnetism of prior D.-C. torquing motors.

Another object of the invention is to provide a D.-C. torquing motor which will only torque the gyro gimbal at such times as the motor is energized and will place no torques on the gyro gimbal because of inherent residual magnetism of the armature.

A further object of the invention is to provide a universally mounted gyroscope having electrolytic gravity switches to energize D.-C. torquing motors which are of the low inertia type and which contain no iron laminations in the armature.

These and other objects of the invention not specifically enumerated above will become readily apparent from the specification and the accompanying drawings in which:

Figure 1 is a top plan view of the gyroscope of this invention illustrating the casing for the gyroscope and with the arrow indicating the direction of movement of the craft in which the gyroscope is mounted.

Figure 2 is a vertical section taken along line 2—2 of Figure 1 with the gyroscope and one of the torquing motors left in elevation.

Figure 12 is a schematic wiring diagram showing the various circuits employed in the gyroscopic instrument of this invention.

Figure 3:
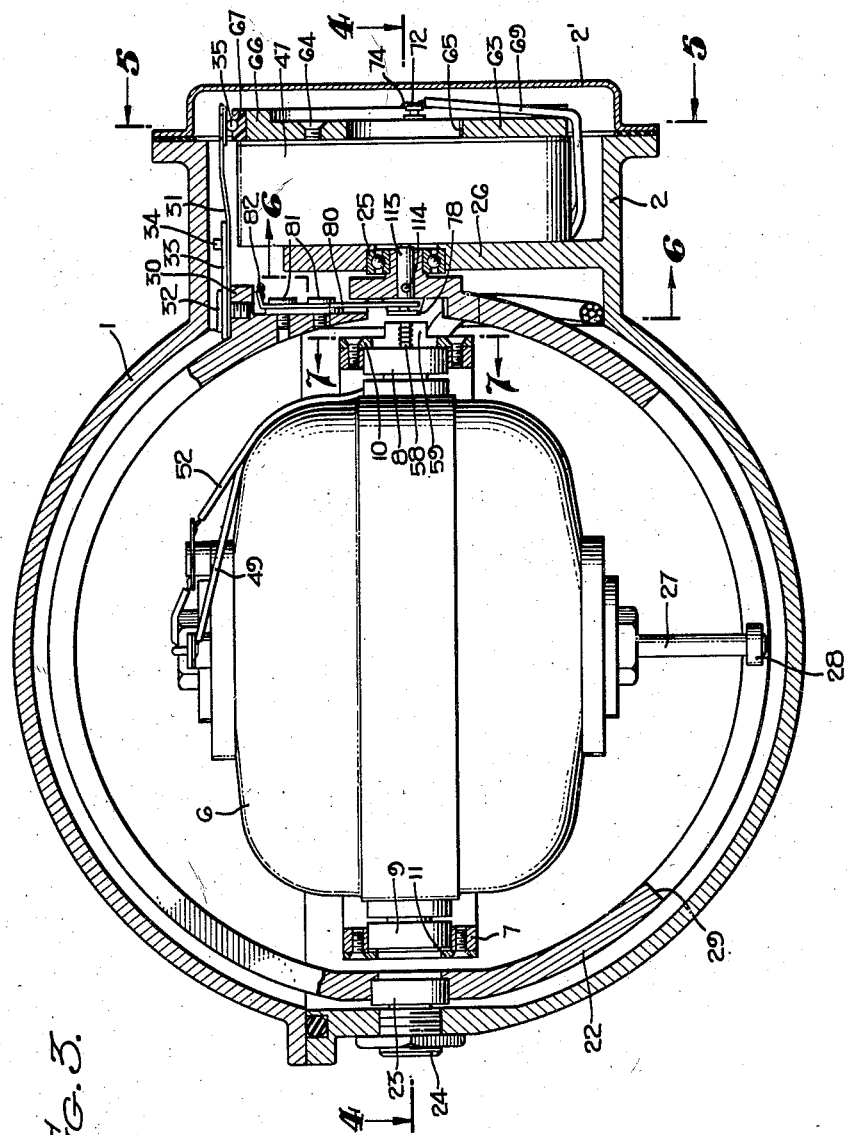
Figure 3 is a vertical sectional view along line 3—3 of Figure 2 with the gyroscope and the other torquing motor in elevation and illustrating the neutrally balanced bail pivotally mounted about the pitch axis of the craft.
Figure 4:
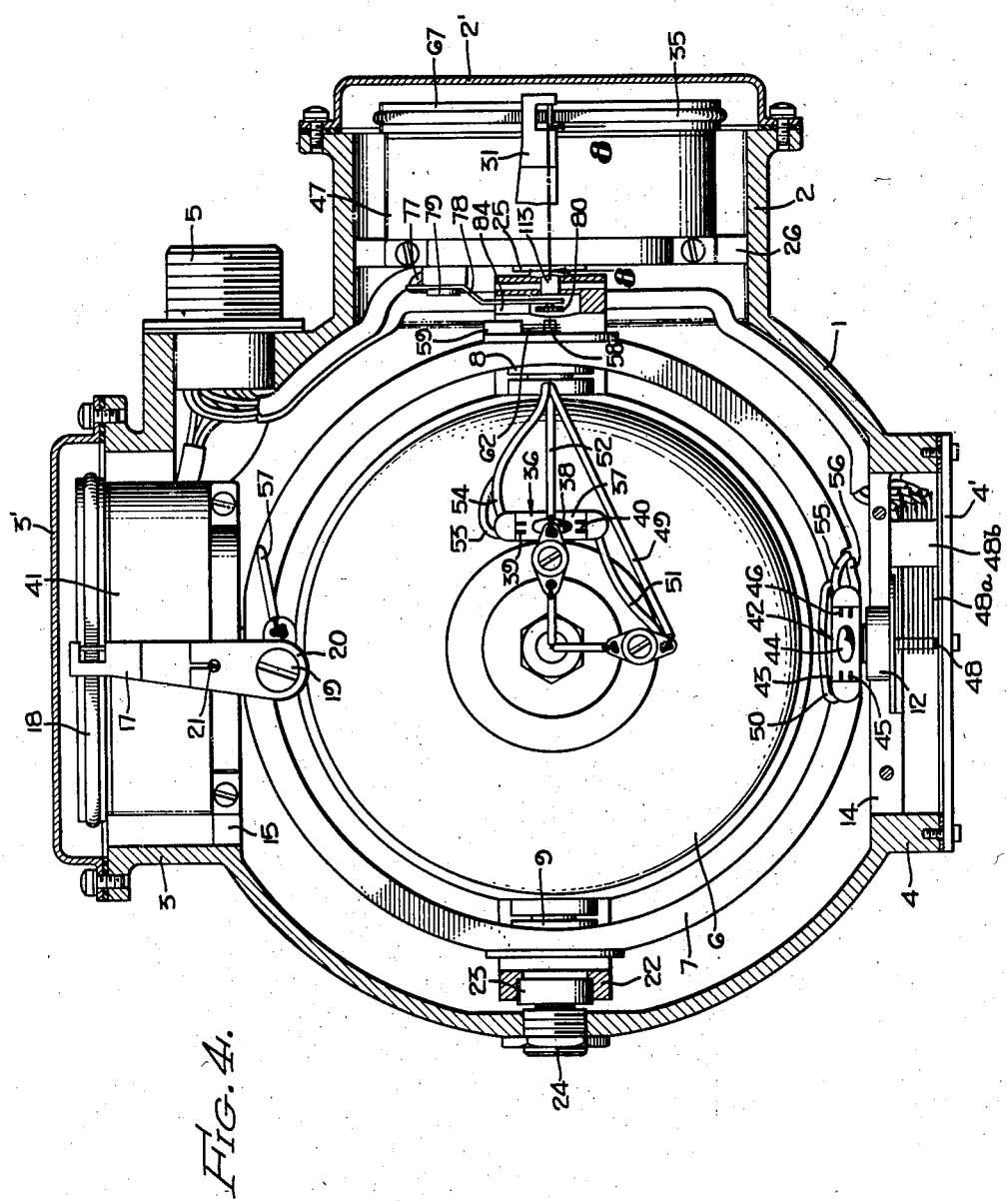
Figure 4 is a horizontal view taken along line 4—4 of Figure 3 with parts left in plan and illustrating the electrolytic gravity switches.

The embodiment of the present invention chosen for illustration includes a divided casing 1 which has projections 2 and 3 for enclosing two torquing motors and a projection 4 for housing slip ring connections. An electrical plug 5 is utilized to supply electrical energy to the various components of the gyrovertical. The projections 2, 3 and 4 have cover plates 2', 3' and 4' respectively to protect the inside of the casing 1 from dust and other foreign substances. The casing 1 contains a gyro rotor (not shown) carried by an inner gimbal 6, which gimbal is pivotally mounted at opposite sides by the outer gimbal 7 mounting ball bearings 8 and 9 for this purpose. The bearings 8 and 9 are retained in position by bearing retainers 10 and 11 respectively.

The outer gimbal 7 is pivotally mounted at its opposite ends by ball bearings 12 and 13 retained in projections 14 and 15 of the casing 1. A support 16 is carried by the outer gimbal 7 and mounts a potentiometer wiper 17 which continually bears against winding 18 carried by one of the erecting motors. The wiper 17 is secured to the support 16 by scerw 19, which also serves to secure a plate 20 having an adjusting screw 21 to vary the pressure of the wiper 17 on winding 18. It is apparent that the wiper 17 will move relative to the winding 18 during movements of the aircraft about its roll axis, and the potentiometer, comprised of winding 18 and wiper 17, will be utilized to control the roll servo of the craft.

A neutrally balanced bail 22 is pivotally mounted about the pitch axis of the craft by a bearing 23 secured to the casing 1 by plug 24 and by a bearing 25 retained in projections 26 of casing 1. The inner gimbal 6 has a pin 27 which carries a roller 28 positioned in groove 29 of the bail 22. This pin serves to maintain the bail in a given position relative to the gyrovertical about the pitch axis, and, since the bail is neutrally balanced, it places no undesirable torques on the inner gimbal which might result in precession of the gyrovertical. At the same time, the aircraft is free to move about the roll axis relative to the gyrovertical since roller 28 can move in groove 29. The bail 22 has a projection 30 which mounts the wiper 31 by means of screw 32. A plate 33 is also mounted by screw 32 and carries an adjustable set screw 34 for adjusting the force of the wiper against the winding 35 which is mounted on the other one of the torquing motors. It is therefore apparent that the potentiometer, consisting of wiper 31 and winding 35, can be utilized to control the pitch servo of the craft carrying the instrument of this invention.

In order to maintain the gyroscope in vertical position, a first electrolytic gravity switch 36 is mounted on the inner gimbal 6 in position to be directly over the pitch axis of the gyroscope when the gyroscope is in vertical position about the pitch axis. This switch consists of a tube 37 which contains a globule 38 of conducting fluid, such as mercury, and has two pairs of contacts 39 and 40. When the gyro is tilted about the pitch axis from true vertical, one or the other of the pairs of contacts will be closed by the conducting fluid and the torquing motor 41 will be energized to return the gyroscope to vertical position about the pitch axis again so the globule 28 comes between the contacts 39 and 40.

Another electrolytic gravity switch 42 is positioned on the outer gimbal ring so as to be directly over the roll axis of the gyroscope when the gyroscope is in true vertical position about the roll axis. The switch 42 is comprised of a tube 43 containing a globule 44 of conducting fluid, such as mercury, and has two pairs of contacts 45 and 46. When the gyroscope moves away from true vertical about the roll axis, the globule 44 will close one or the other of contacts 45 and 46 and the torquing motor 47 will be energized to precess the gyro back to true vertical about the roll axis, at which time the globule 44 will again be centered between the contacts. It will be understood that the torquing motor 41 is positioned about the roll axis to correct the gyro about the pitch axis and that the torquing motor 47 is positioned about the pitch axis to correct the gyrovertical about the roll axis since it is a well known principle that a gyro precesses at right angles to the direction of the torque applied.

Figure 7:
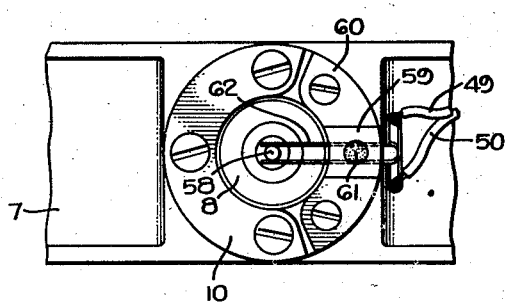
Figure 7 is a vertical sectional view along line 7—7 of Figure 3 illustrating the manner in which the leads pass through the outer gimbal ring to the inner gimbal ring of the gyroscope.

In order to supply electrical energy to the components of the gyroscope which have been discussed, a number of leads are introduced into a casing 1 through plug 5. Seven of these leads are applied to the slip rings carried on shaft projection 48 of the outer gimbal by double wire leads 48a carried by a member 48b attached to projection 14. These leads pass through bearing 12 and are then secured to the outer gimbal ring for movement therewith. A lead 49 serves to supply energy to the gyro motor and branch lead 50 supplies energy to switch 42 while branch lead 51 serves to supply energy to switch 36. The gyro motor has a return lead 52 while switches 36 and 42 have return leads 53, 54 and 55, 56 respectively. In addition, the lead 57 lies along the outer gimbal and passes to the wiper 17 so that this lead can move with the outer gimbal and with the wiper. It it to be noted that the four leads for the gyro motor and switch 36 pass from the outer gimbal to the inner gimbal through slip rings mounted on shaft extension 58 of the inner gimbal. The manner in which the leads bear on these slip rings is illustrated in Figure 7 where a projection 59 is shown carried by a bearing retainer section 60. The projection 59, having a sealed opening 61, supports four double wire leads 62 which bear against each of the slip rings carried on shaft projection 58 and these slip rings connect to the four leads which pass to the inner gimbal.

Figure 5:
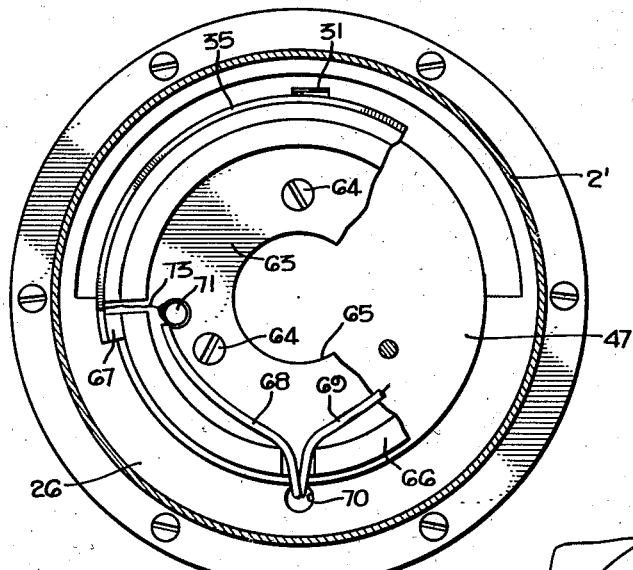
Figure 5 is a vertical section along line 5—5 of Figure 3 illustrating the potentiometer positioned about the pitch axis.

The manner in which the wiring is directed to windings 18 and 35 is illustrated in Figure 5 wherein a central member 63 is secured to the back of motor 47 by means of screws 64. The member 63 has a central circular opening 65 and a projection 66 around its circumference. This projection 66 mounts an insulated ring section 67 which has a groove for receiving winding 35. The leads 68 and 69 for the winding 35 pass directly from plug 5 through an opening 70 in projection 26 and then to wiring posts 71 and 72 respectively. The leads 73 and 74 pass through openings in projection 66 and in ring section 67 and connect posts 71 and 72 to opposite ends of windings 35. The leads 75 and 76 for winding 18 are also led directly from plug 5 through an opening in projection 15 and connect with opposite ends of the winding 18 in a similar manner as described in connection with winding 35; the winding 18 also being supported by motor 41 in the same manner as winding 35 is supported by motor 47.

Figure 6:
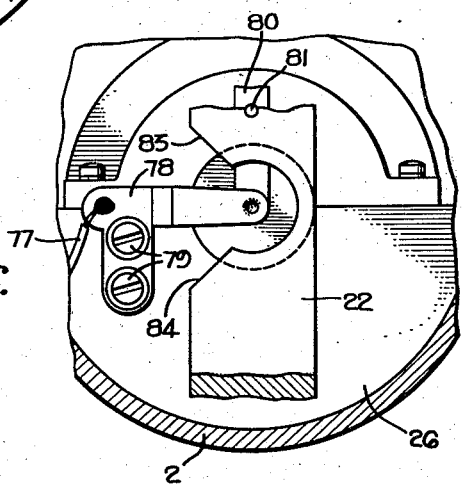
Figure 6 is a vertical sectional view along line 6—6 of Figure 3 illustrating the pitch pick-off lead.

In order to connect wiper arm 31 to plug 5, the lead 77 passes directly to a conducting plate 78 mounted on projection 26 by means of screws 79. This plate projects into a cutaway opening in bail 22 in the manner shown in Figure 6. The end of the plate 78 bears against a conducting plate 80 which is secured to bail 22 by means of screws 81, and it will be noted that the contact point between these two plates is directly in line with the bail axis. The lead 82 connects plate 80 with wiper 31 and completes the circuit which will continually supply a connection with wiper 31 regardless of the position assumed by the casing relative to the bail. The bail has a V-shaped section removed as defined by the sides 83, 84 shown in Figure 6 so that substantially relative movement can take place.

Figure 8:
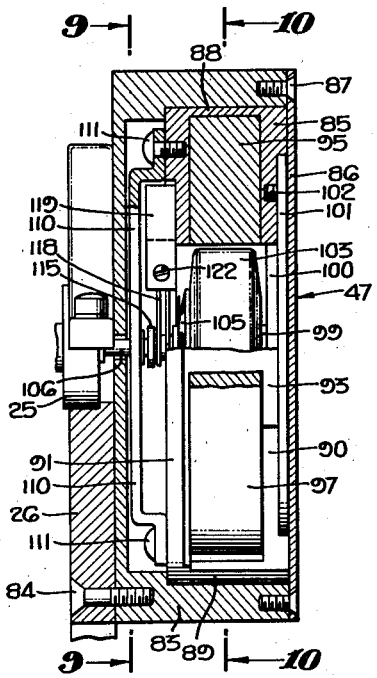
Figure 8 is a vertical section along line 8—8 of Figure 4 with parts left in elevation and illustrating the construction of one of the torquing motors.
Figure 11:
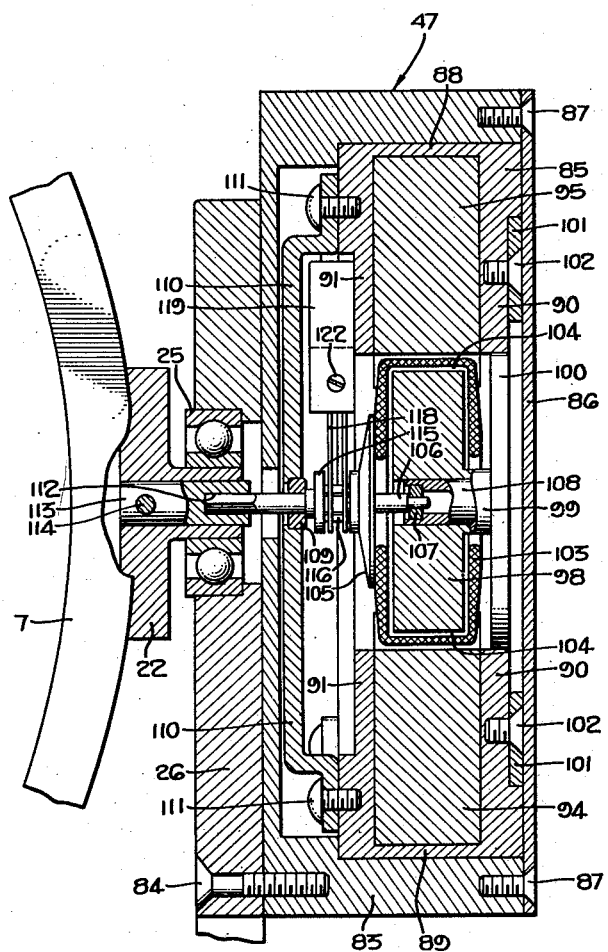
Figure 11 is a vertical cross-sectional view along line 11—11 of Figure 10 illustrating the torquing motor construction.

The manner in which the motors 41 and 47 are connected with switches 36 and 42 respectively will be described in connection with the description of the torquing motor construction. Figures 8 and 11 illustrate the cup-shaped motor frame 83 which is secured to projection 26 by means of screws 84. This frame receives a pole retaining piece 85 which is secured within frame 83 by cover plate 86 secured to the frame by screws 87. This pole retaining piece has ends 88 and 89 and sides 90 and 91 each of which have a central opening for receiving the motor armature and curved members 92 and 93 serve to contact the sides around these openings. The pole pieces 94 and 95 are securely held between the sides of retainer 85 in position to have one end of each pole piece adjacent to the armature in the manner illustrated in Figure 11. The circular magnets 96 and 97 are positioned within frame 83 so that like poles of the magnets contact the same pole piece in order to provide a flux path from one pole piece to the other. The magnets 96 and 97 have curved portions 96a and 97a to receive members 92 and 93 respectively, and it is unnecessary to provide additional support for the magnets since they will firmly grip the pole pieces.

The motor and armature construction for the torquing motors is fully described in United States patent application Serial No. 332,688, filed January 22, 1953, by Edward M. Elmer and includes an armature core 98 with a projection 99 which has a first circular section 100 for spacing the armature in the opening of side 90 and a second circular projection 101 which receives screws 102 to secure the core to the retainer 85. The core, which consists of soft iron, is thus securely mounted between the pole pieces. The armature winding 103 is originally wound around a uniform coating applied to the armature core as explained in the above cited application, and then this coating is removed to provide a uniform spacing 104 between the armature winding and the core. Because of the manner in which the armature is wound, it is substantially self-supporting, and, in order to provide still further support for the armature, it is impregnated with any suitable type of non-conducting material, such as a plastic. Because of this self-supporting feature of the armature, it can be supported at one side by an armature hub 105, which is secured over one end opening in the armature while the other end opening in the armature receives the projection 99 of the core. The hub 105 can be fastened to the armature windings in any suitable manner and is also secured to armature shaft 106 to rotate therewith. The armature shaft is supported at one end by bearing 107 retained by a hollow, cylindrical member 108 secured in the central opening of core 98. Another bearing 109 is provided for shaft 106 and is mounted in a plate 110 which is secured to frame 85 by screws 111. The end of shaft 106, passing through bearing 109, is positioned in a square socket 112 in a shaft 113 which projects into bail 22 and a retainer pin 114 passes through bail 22 and shaft 113 in order to rigidly secure these elements together.

Figure 9:
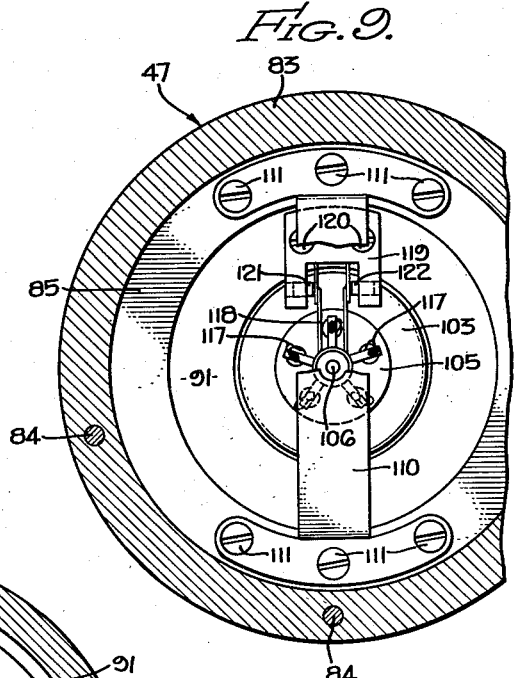
Figure 9 is a vertical section along line 9—9 of Figure 8 showing the commutator for one of the torquing motors.
Figure 10:
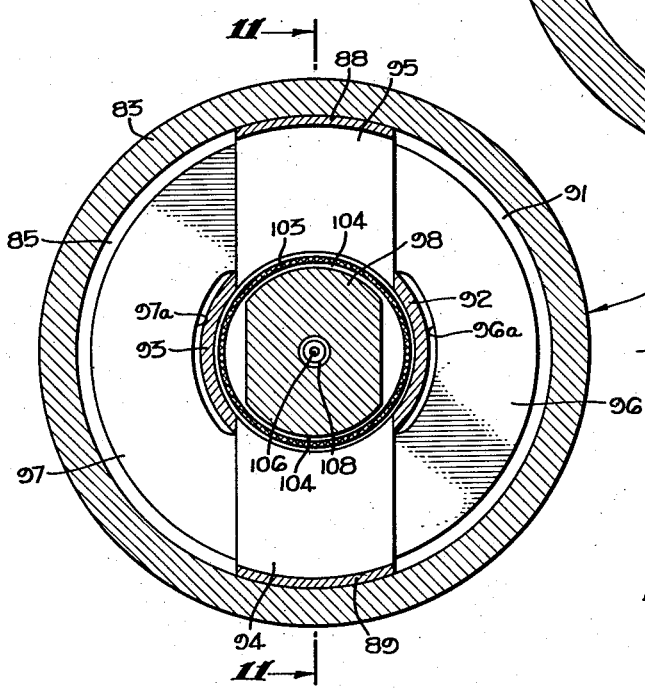
Figure 10 is a vertical sectional view along line 10—10 of Figure 8 illustrating the armature and pole pieces of one of the torquing motors.

The shaft 106, intermediate bearings 107 and 109, mounts a commutator 115 which consists of five commutator bars 116. These commutator bars are each connected with individual sections of the armature winding by the leads 117 illustrated in Figure 9. The pairs of commutator brushes 118 are supported by an insulated bracket 119 secured to frame 85 by screws 120, and the pressure of the brushes on the commutator bars can be adjusted by screws 121 and 122 carried by the bracket arms. The leads 123 and 124 for motor 47 are supplied with electrical power from gravity switch 42 in the manner which will be presently described. It is understood, of course, that the construction of the motor 41 is exactly similar to that described for motor 47 except that the shaft for motor 41 will be directly connected to the outer gimbal of the gyroscope rather than to bail 22. Also, the leads 125 and 126 for motor 41 will be supplied with electrical energy from gravity switch 36 rather than from gravity switch 42.

It will be noted that the circular magnets, pole pieces and core for both torquing motors 41 and 47 are rigidly connected with the gyroscope casing and will move therewith relative to the gyro. Also, the armature 103 of motor 47 will be rigidly connected with bail 22 which, in turn, will be positioned by the inner gimbal of the gyroscope, and the armature for motor 41 will be rigidly secured to the outer gimbal of the gyroscope to be positioned thereby. With these facts in mind, the operation of the gyrovertical of this invention will now be described in connection with the schematic diagram of Figure 12. If the gyrovertical becomes displaced from true vertical about the pitch axis, the globule 38 will move into contact with either the contacts 39 or the contacts 40 of the switch 36 and will cause the corresponding lead 53 or 54 to become conductive. If the line 53 becomes conductive, the solenoid 127 will be energized and this will cause switch arms 128 and 129 to move into contact with supply lines 130 and 131 respectively. The erecting motor 41 will thereafter apply a torque to the outer gimbal ring 7 to erect the gyroscope about the pitch axis until it is again in vertical position. However, if the globule 38 connects the contacts 40, the line 54 will energize solenoid 132 with the result that switch arms 133 and 134 will move into contact with leads 135 and 136 respectively. Since switch 133 has an opposite polarity to switch 128 and switch 134 has an opposite polarity to switch 129, it is seen that the erecting motor will apply an erecting torque to the outer gimbal in an opposite direction when solenoid 132 is energized and this torque will be in a direction to again return the gyroscope to gravity vertical about the pitch axis. In the same manner, the gyroscope can be retained in true vertical about the roll axis since, when globule 44 moves against contacts 45, the solenoid 137 will be energized thus pulling switches 138 and 139 into contact with lines 140 and 141 respectively. This will cause the erecting motor 47 to apply a torque to the bail 22 and to the inner gimbal in a direction to cause the gyroscope to precess about the outer gimbal axis until it has been returned to true vertical about the roll axis. However, if the globule 44 moves in a direction to connect contacts 46, line 56 will energize solenoid 142 which in turn will move switches 143 and 144 into contact with lines 145 and 146 respectively. Because the polarity of switches 145 and 146 is reversed from switches 138 and 139, erecting motor 47 will apply a reverse torque on bail 22 when contacts 46 are closed in order to precess the gyro back to true vertical in a direction which will move the globule 44 away from contacts 46. Thus it will be seen that the electrolytic gravity switches 36 and 42 serve to cause erecting motors 41 and 47 to apply torques to the gyroscope in such a manner as to maintain it in a true vertical position. Since the gyro is retained in this position, the potentiometers comprising windings 18 and 35 and wipers 17 and 31 can be used to control both the pitch and roll of the craft carrying the gyroscope of this invention.

Since previous erecting motors have utilized an armature winding wound on iron laminations, it was necessary to use alternating current motors in order to eliminate the inherent residual magnetism in the armature. Direct current motors could not be used because when the aircraft and motor pole pieces moved relative to the armature, this residual magnetism caused the armature to place undesirable torques upon the gyroscope which would precess the gyroscope away from true vertical. However, in the present invention, when the pole pieces 94 and 95 move with the craft relative to the armature winding 103, no such undesirable torques will be placed upon the gyroscope gimbals since the armature 103 contains no iron laminations or other magnetic materials and, therefore, no residual magnetism. This invention makes it possible to utilize D.-C. torquing motors in connection with gyroverticals and obtain satisfactory performance of the instrument. In the case of most moving craft, it is inconvenient to have a supply of alternating current and, therefore, it is desirable to have the instruments use the usual type of D.-C. supply. In the present invention, a single source of D.-C. current can be utilized to energize the control potentiometers, the gyroscope motor and both of the erecting motors with a minimum of wiring difficulty and without the necessity of having a supply of A.-C. current. The erecting motors are of simple, compact construction so as to be conveniently utilized in connection with the gyroscopic instrument.

It is understood that while the description of the invention refers to the gyroscope as being pivotally mounted about the pitch and roll axes, the gyroscope can be used about any two axes of a craft to correspond to any type of control desired and, of source, the pitch and roll axes of the instrument are determined solely by the manner in which the instrument is mounted in the craft. Further, while the neutrally balanced bail 22 has been utilized to erect the gyroscope about the roll axis, any other suitable connection can be utilized. Also, it is apparent that the direct current motors can be replaced by other types of direct current force applying means, such as solenoids, wherein a wholly nonmagnetic member is utilized. While the direct current motors have been described as having their armatures connected to the gyroscope, it is obvious that the armatures could be fixed to the aircraft with the other elements of the motor connected to the gyroscope. Various other modifications may obviously be resorted to by those skilled in the art without departing from the spirit or scope of the invention as set forth in the appended claims.

What is claimed is:

1. In an instrument for controlling the movement of a movable craft, a universally mounted gyroscope, a gravity sensitive means for sensing movement of said gyroscope away from true vertical about one of its axes, a direct current motor responsive to said gravity sensitive means for applying an erection torque to said gyroscope to return it to true vertical about said one axis, said motor having pole pieces and a core movable with said craft and a cylindrical armature connected to said gyroscope, and means for mounting said armature for rotation about an axis in line with said one axis, said armature being constructed of wholly non-magnetic material so as to have no inherent residual magnetism remaining after energization of the armature by said gravity sensitive means.

2. In an instrument for controlling movement of a craft, a gyroscope having at least one gimbal, gravity sensitive means energized upon movement of said gyroscope away from true vertical about the axis of said gimbal, a direct current motor responsive to energization of said gravity sensitive means to apply a torque to said gyroscope in a direction to erect it to true vertical, said direct current motor having pole pieces and a core carried by said craft and a cylindrical armature disposed concentric with said gimbal axis and mounted for rotation about said axis, said armature being comprised of windings and winding support both constructed of wholly non-magnetic material so as to have no residual magnetism after energization by said gravity means.

3. In an instrument for controlling a movable craft, a universally mounted gyroscope, gravity-sensitive means energized upon movement of said gyroscope away from true vertical about one of its axes, direct current means responsive to said gravity means for applying an erection torque to said gyroscope to return it to true vertical about said one axis, said direct current means having a magnetic flux path producing means rotatable about said axis with said aircraft and an armature positioned within said flux path and mounted concentrically about said axis for rotation only, said armature being constructed of wholly non-magnetic material so as to have no inherent residual magnetism.

4. An instrument for controlling the movement of a craft, a universally mounted gyroscope, gravity-sensitive means energized upon movement of said gyroscope away from true vertical and a direct current torquing motor energized by said gravity-sensitive means to precess said gyroscope back to true vertical, said direct current motor having an armature symmetrically arranged about an axis, said armature being mounted for rotation about said axis and being constructed of wholly non-magnetic material so as to have no residual magnetism.

5. In an instrument as defined in claim 4 wherein said armature is comprised of a winding and a winding support arranged to form a cylindrical portion and end portions symmetrically arranged about said axis.

6. In an instrument for controlling the movement of a craft, a gyroscope having at least one gimbal, means for providing a torquing signal, a direct current motor responsive to said signal for applying a torque to said gimbal, said motor having a cylindrical armature mounted for rotation about an axis concentric with said armature, and means for connecting said armature to said gimbal, said armature being constructed of wholly non-magnetic material so that no undesirable torques will be placed on said gimbal during de-energization of said armature.

7. In an instrument as defined in claim 6 wherein said armature is comprised of a winding and a winding support both constructed of wholly non-magnetic material.

8. In an instrument as defined in claim 7 wherein said winding support comprises non-magnetic plastic material impregnated into the windings.

9. In an instrument for controlling the movement of a craft, a gyroscope having two gimbals, means for providing a torquing signal, a direct current motor responsive to said signal for applying a torque to one of said gimbals to erect said gyroscope, said motor having means supported by said craft for producing a magnetic flux path and having a cylindrical armature positioned within said flux path and connected to said one gimbal, and means for mounting said armature for rotation about an axis concentric with said armature, said armature being constructed of wholly non-magnetic material so that no undesirable torque will be placed on said one gimbal because of rotation of the armature relative to the field during the time the armature is de-energized.

10. In an instrument as defined in claim 9 wherein said armature is comprised of a winding and a winding support both constructed of wholly non-magnetic material.

11. In an instrument as defined in claim 10 wherein said winding support comprises non-magnetic plastic material impregnated into the windings.

12. In an instrument for controlling movement of a craft, a gyroscope mounted by inner and outer gimbals, a first gravity sensitive means mounted to sense deviations of said gyroscope from true vertical about the inner gimbal axis, a second gravity sensitive means mounted to sense deviations of said gyroscope from true vertical about the outer gimbal axis, a first direct current motor energized by said first gravity sensitive means to apply a torque about the outer gimbal axis to precess said gyroscope back to true vertical about the inner gimbal axis and a second direct current motor energized by said second gravity sensitive means to apply a torque about the inner gimbal axis to precess said gyroscope back to true vertical about the outer gimbal axis, said first and second erection motors each having an armature symmetrically arranged about an axis and mounted for rotation about said axis, and means for producing a magnetic flux for said armatures, said armatures being constructed of wholly non-magnetic material so as to have no residual magnetism to cause undesirable torques when said armatures are de-energized.

13. In a gyroscopic instrument for a movable craft, a gyroscope having inner and outer gimbals supported about separate axes, means for providing a torquing signal, a direct current motor responsive to said signal for applying a torque to one of said gimbals to erect said gyroscope, said motor comprising means for producing a flux path and armature means positioned within said flux path and connected with said signal providing means, one of said means which comprises said motor being supported by said craft and the other being connected to said one gimbal, said armature means comprising a cylindrical winding mounted concentrically about the axial line of said one gimbal, said armature being constructed of non-magnetic material to prevent undesirable torquing while the armature is de-energized, the cylindrical shape of said winding providing for the application of a uniform torquing force to said one gimbal regardless of the position of the craft relative to the gimbal.

14. In a gyroscopic instrument for a movable craft, a gyroscope having two gimbals each mounted for movement about a separate axis, a direct current motor for applying a torque to one of said gimbals to erect said gyroscope, said motor having means supported by said craft for producing a flux path and having a cylindrical armature positioned within said flux path and connected to said one gimbal, means for selectively connecting said armature with a power source to energize said motor, and means for mounting said armature for rotation only about an axis concentric with said armature and in line with the axis of said one gimbal, said armature being constructed of non-magnetic material to prevent undesirable torquing while the armature is de-energized, the cylindrical shape of said armature providing for the application of a uniform torquing force to said one gimbal regardless of the position of the craft relative to the gimbal.

15. In a gyroscopic instrument for a movable craft, a gyroscope having two gimbals, means for producing a torquing signal, a direct current motor responsive to said signal for applying a torque to one of said gimbals to erect said gyroscope, said motor having a cylindrical armature mounted about a concentric axis for rotation about said axis in response to a torquing signal, and means for connecting said armature to said one gimbal, said armature being of wholly non-magnetic material to prevent undesirable torquing while the armature is de-energized, the cylindrical shape of said armature providing for the application of a uniform torquing force on said one gimbal regardless of the position of the craft relative to the gimbal.

References Cited in the file of this patent

UNITED STATES PATENTS

| | | |
|---|---|---|
| 1,985,082 | Faus | Dec. 18, 1934 |
| 2,278,379 | Koster | Mar. 31, 1942 |
| 2,412,204 | Carter et al. | Dec. 10, 1946 |
| 2,528,487 | Adkins | Nov. 7, 1950 |
| 2,682,082 | Ward | July 6, 1954 |

FOREIGN PATENTS

| | | |
|---|---|---|
| 745,983 | Germany | Dec. 13, 1944 |
| 633,942 | Great Britain | Dec. 30, 1949 |
| 640,632 | Great Britain | July 26, 1950 |